(12) United States Patent
Tseng

(10) Patent No.: US 10,500,428 B2
(45) Date of Patent: Dec. 10, 2019

(54) TRAMPOLINE AND MANUFACTURING METHOD THEREOF

(71) Applicant: Ming Fu Tseng, Fairfax, VA (US)

(72) Inventor: Ming Fu Tseng, Fairfax, VA (US)

( * ) Notice: Subject to any disclaimer, the term of this patent is extended or adjusted under 35 U.S.C. 154(b) by 157 days.

(21) Appl. No.: 15/642,802

(22) Filed: Jul. 6, 2017

(65) Prior Publication Data
US 2018/0280749 A1 Oct. 4, 2018

Related U.S. Application Data

(60) Provisional application No. 62/481,471, filed on Apr. 4, 2017.

(51) Int. Cl.
| | |
|---|---|
| *A63B 5/11* | (2006.01) |
| *B29C 65/04* | (2006.01) |
| *B29K 27/06* | (2006.01) |
| *B29C 65/00* | (2006.01) |
| *A63B 1/00* | (2006.01) |
| *B29L 31/52* | (2006.01) |

(52) U.S. Cl.
CPC ............... *A63B 5/11* (2013.01); *A63B 1/00* (2013.01); *A63B 2225/62* (2013.01); *B29C 65/04* (2013.01); *B29C 66/1122* (2013.01); *B29C 66/53461* (2013.01); *B29C 66/71* (2013.01); *B29K 2027/06* (2013.01); *B29L 2031/52* (2013.01)

(58) Field of Classification Search
CPC ... A63B 5/11; A63B 2225/62; A63B 69/0097; A63B 63/00; B29C 66/1122; B29C 66/53461; B29C 66/71; B29C 65/04; B29L 2031/52; B29K 2027/06

See application file for complete search history.

(56) References Cited

U.S. PATENT DOCUMENTS

| | | | | |
|---|---|---|---|---|
| 663,856 | A * | 12/1900 | Browder | A62B 1/22 182/140 |
| 2,294,509 | A * | 9/1942 | Moeller | A62B 1/22 182/139 |
| 4,415,151 | A * | 11/1983 | Daniels | A63B 5/11 482/28 |
| 4,516,767 | A * | 5/1985 | Eskijian | A63B 5/11 482/27 |
| 4,576,375 | A * | 3/1986 | Roberts | A63B 5/11 472/129 |

(Continued)

FOREIGN PATENT DOCUMENTS

| | | | | |
|---|---|---|---|---|
| FR | 2657528 A1 | * | 8/1991 | ............... A63B 5/11 |
| FR | 2664170 A2 | * | 1/1992 | ............... A63B 5/10 |
| GB | 2539235 A | * | 12/2016 | ............... A63B 5/11 |

*Primary Examiner* — Loan B Jimenez
*Assistant Examiner* — Shila Jalalzadeh Abyaneh
(74) *Attorney, Agent, or Firm* — WPAT, PC

(57) ABSTRACT

The present invention provides a trampoline comprising a top panel, and a main body, wherein the method that the top panel attached to the mail body is RF welding or heat sealing. The present invention also provides a trampoline wherein the top panel and the main body are formed as a single piece. The present invention further provides a method of manufacturing trampoline wherein the top panel is attached to the mail body by RF welding or heat sealing, or the top panel and the mail body are formed as a single piece.

7 Claims, 5 Drawing Sheets

(56) References Cited

U.S. PATENT DOCUMENTS

| | | | | |
|---|---|---|---|---|
| 5,299,989 A * | 4/1994 | Boyd | .................. | A63B 5/11 182/139 |
| 5,385,518 A * | 1/1995 | Turner | .................. | A63B 5/11 482/23 |
| 5,637,057 A * | 6/1997 | Collura | .................. | A63B 5/11 482/27 |
| 6,508,682 B1 * | 1/2003 | Clark | .................. | B63B 7/08 441/131 |
| D484,940 S * | 1/2004 | Peterson | .................. | D21/803 |
| 7,018,322 B1 * | 3/2006 | Carter | .................. | A63B 5/11 482/27 |
| 7,468,020 B2 * | 12/2008 | Lai | .................. | A63B 5/11 16/324 |
| 8,038,580 B2 * | 10/2011 | Pieper Genannt Schmauck | ......... | A63B 5/11 482/27 |
| 8,043,172 B2 * | 10/2011 | Campanaro | .................. | A63B 65/06 273/395 |
| 9,364,699 B2 * | 6/2016 | Gordon | .................. | A63B 5/11 |
| 9,844,713 B1 * | 12/2017 | Kaufmann | .................. | A63B 5/11 |
| 2002/0010053 A1 * | 1/2002 | Peterson | .................. | A63B 5/11 482/27 |
| 2004/0058781 A1 * | 3/2004 | Plante | .................. | A63B 5/11 482/27 |
| 2005/0043122 A1 * | 2/2005 | Publicover | .................. | A63B 5/11 473/465 |
| 2005/0054485 A1 * | 3/2005 | McDermott | .................. | A63B 5/11 482/27 |
| 2005/0148433 A1 * | 7/2005 | Wang | .................. | A63B 5/11 482/27 |
| 2006/0073748 A1 * | 4/2006 | Boujon | .................. | A63B 5/11 441/40 |
| 2006/0160664 A1 * | 7/2006 | Lavabre | .................. | A63B 5/11 482/27 |
| 2007/0000182 A1 * | 1/2007 | Boujon | .................. | A63B 5/11 52/2.17 |
| 2007/0204406 A1 * | 9/2007 | Thisse | .................. | A47C 7/021 5/655.3 |
| 2011/0136597 A1 * | 6/2011 | Gordon | .................. | A63B 5/11 473/478 |
| 2014/0342880 A1 * | 11/2014 | Nelson | .................. | A63B 5/11 482/27 |
| 2015/0076888 A1 * | 3/2015 | Xu | .................. | A63G 9/14 297/452.18 |
| 2015/0190666 A1 * | 7/2015 | Chen | .................. | A63B 5/11 482/29 |
| 2016/0199718 A1 * | 7/2016 | Holland | .................. | A63B 69/0071 473/435 |
| 2016/0310774 A1 * | 10/2016 | Publicover | .................. | A63B 5/11 |

* cited by examiner

TRAMPOLINE AND MANUFACTURING METHOD THEREOF

BACKGROUND OF INVENTION

1. Field of the Invention

The present invention relates to a trampoline and a manufacturing method thereof and, more particularly, to a trampoline with particular mesh design with quickly manufacturing method.

2. Description of the Prior Art

As shown in FIG. 4, in the prior art of trampolines and their manufacture, a top panel of the trampoline is secured to the main body of the trampoline using weaved rope or cord. These methods take a tremendous amount of time and labor to manufacture.

SUMMARY OF THE INVENTION

The present invention provides a trampoline which can be manufactured quickly and safer.

According to an aspect of the present invention, there is provided a trampoline comprising a top panel, and a main body, wherein the method that the top panel attached to the main body is RF welding or heat sealing.

According to one embodiment of the trampoline, the main body comprises a toroidal shape with a central opening.

According to one embodiment of the trampoline, the size and shape of the top panel is sized according to the central opening of the main body.

According to one embodiment of the trampoline, the main body is gas-filled.

According to one embodiment of the trampoline, the top panel comprises a flat circular panel comprising a laminated polyvinyl chloride material.

According to one embodiment of the trampoline, the top panel further comprises small venting holes sized small enough such that human toes or fingers cannot be trapped by the small venting holes.

According to one embodiment of the trampoline, the top panel further comprises ovular holes larger than the small venting holes.

According to one embodiment of the trampoline, the material of the top panel and the main body are the same.

According to one embodiment of the trampoline, the top panel and the main body are formed as a single piece.

According to an aspect of the present invention, there is provided a manufacturing method of trampoline comprising providing a top panel and a main body, and heat sealing or RF welding the top panel to the main body around the perimeter of the top panel and the main body.

According to one embodiment of the manufacturing method of trampoline, the size and shape of the top panel is sized according to the central hole of the main body.

According to one embodiment of the manufacturing method of trampoline, the top panel and the main body are formed as a single piece.

According to one embodiment of the manufacturing method of trampoline, the material of the top panel and the main body are the same.

By using a heat sealing or RF welding, the advantages of the present invention are that the top panel can be attached to the main body quickly and without leaving gaps where the top panel and the main body meet.

To make the aforementioned and other objects, features and advantages of the present invention clearer, detailed illustration is provided in the following with reference to the accompanying drawings.

BRIEF DESCRIPTION OF THE DRAWINGS

The present invention will become more fully understood from the detailed description given herein below for illustration only, and thus are not limitative of the present invention, and wherein.

DESCRIPTION OF THE INVENTION

Figure 1:
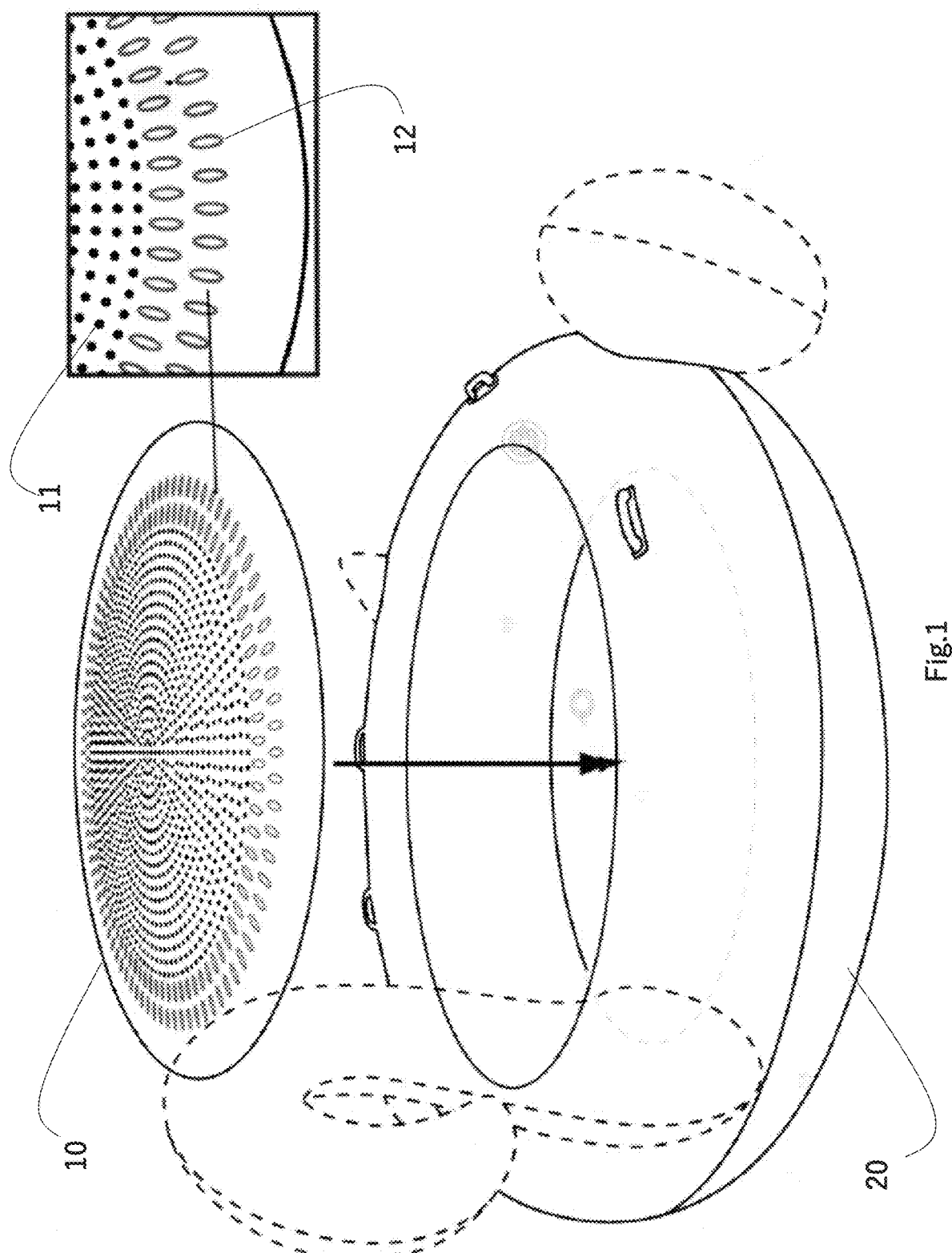
FIG. 1 is a schematic view of a step in the manufacturing method for the trampoline.
Figure 2:
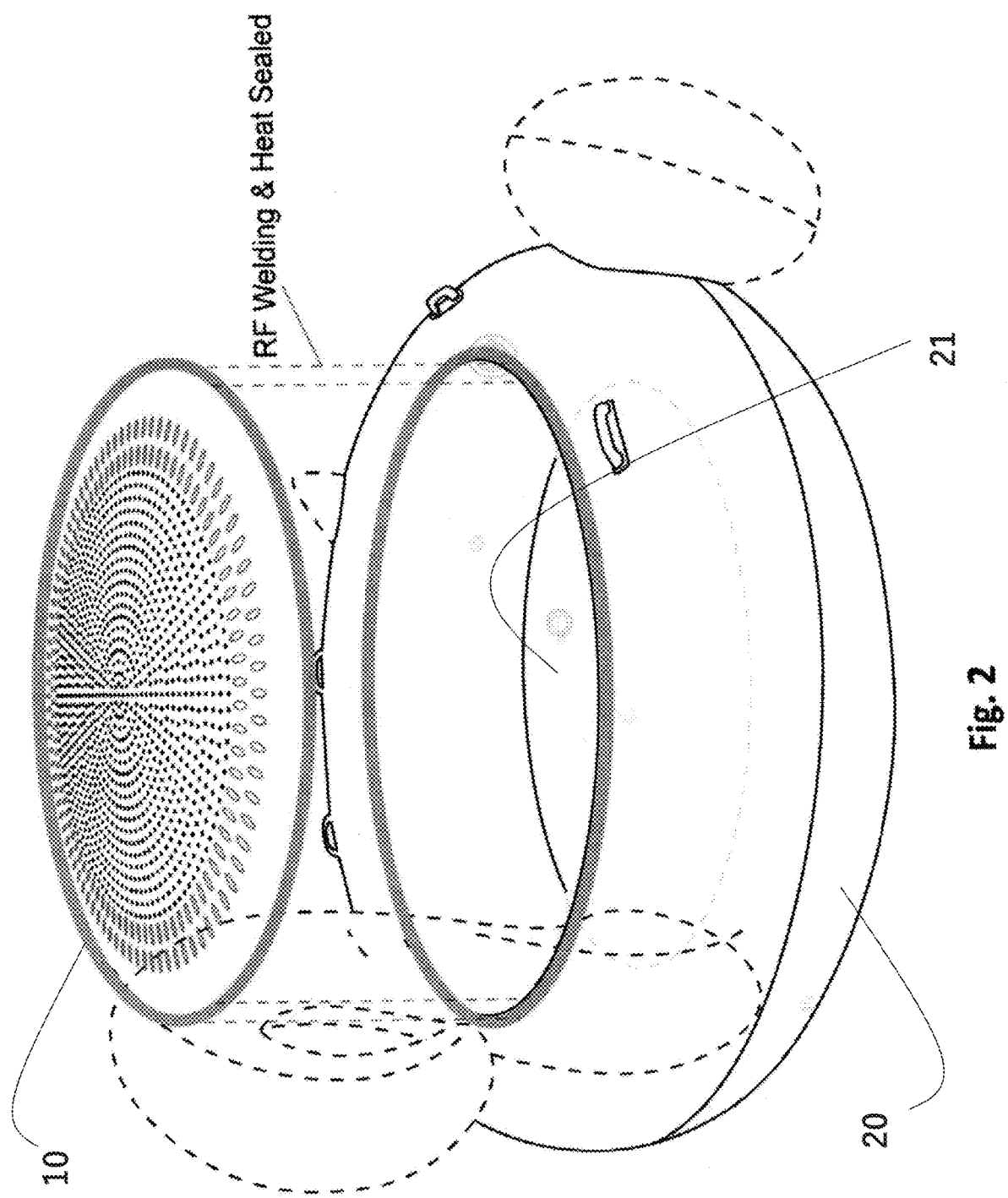
FIG. 2 is a schematic view of a step in the manufacturing method for the trampoline.
Figure 3:
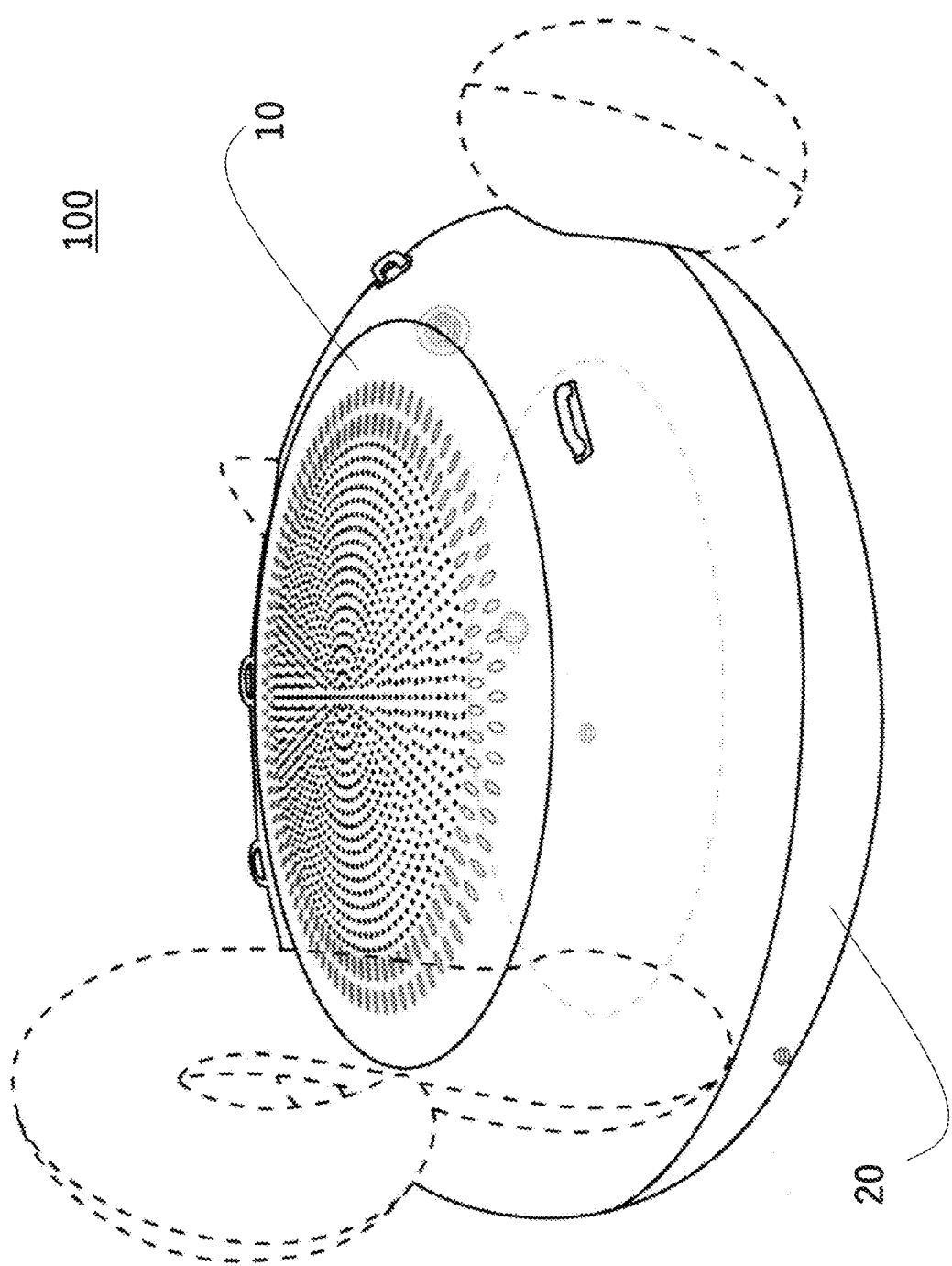
FIG. 3 is a schematic view of a step in the manufacturing method for the trampoline.
Figure 4:
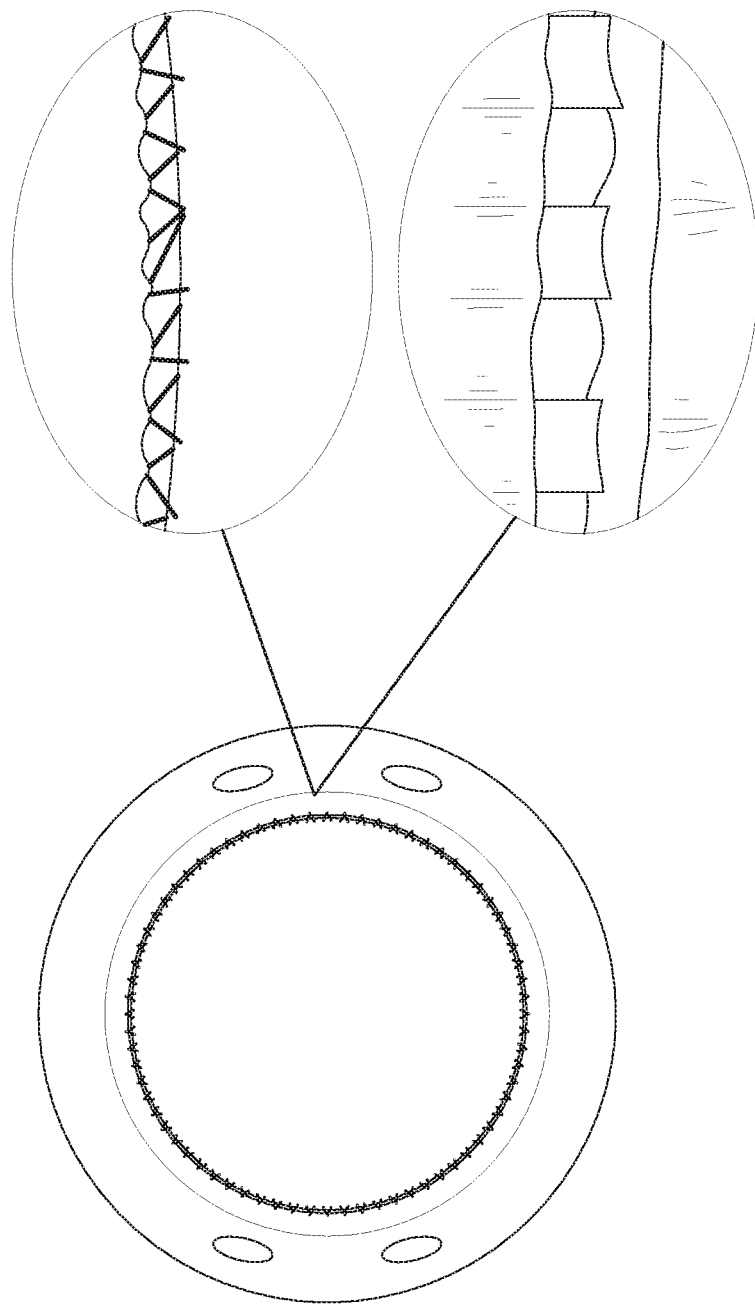
FIG. 4 is a schematic view of the prior art.
Figure 5:
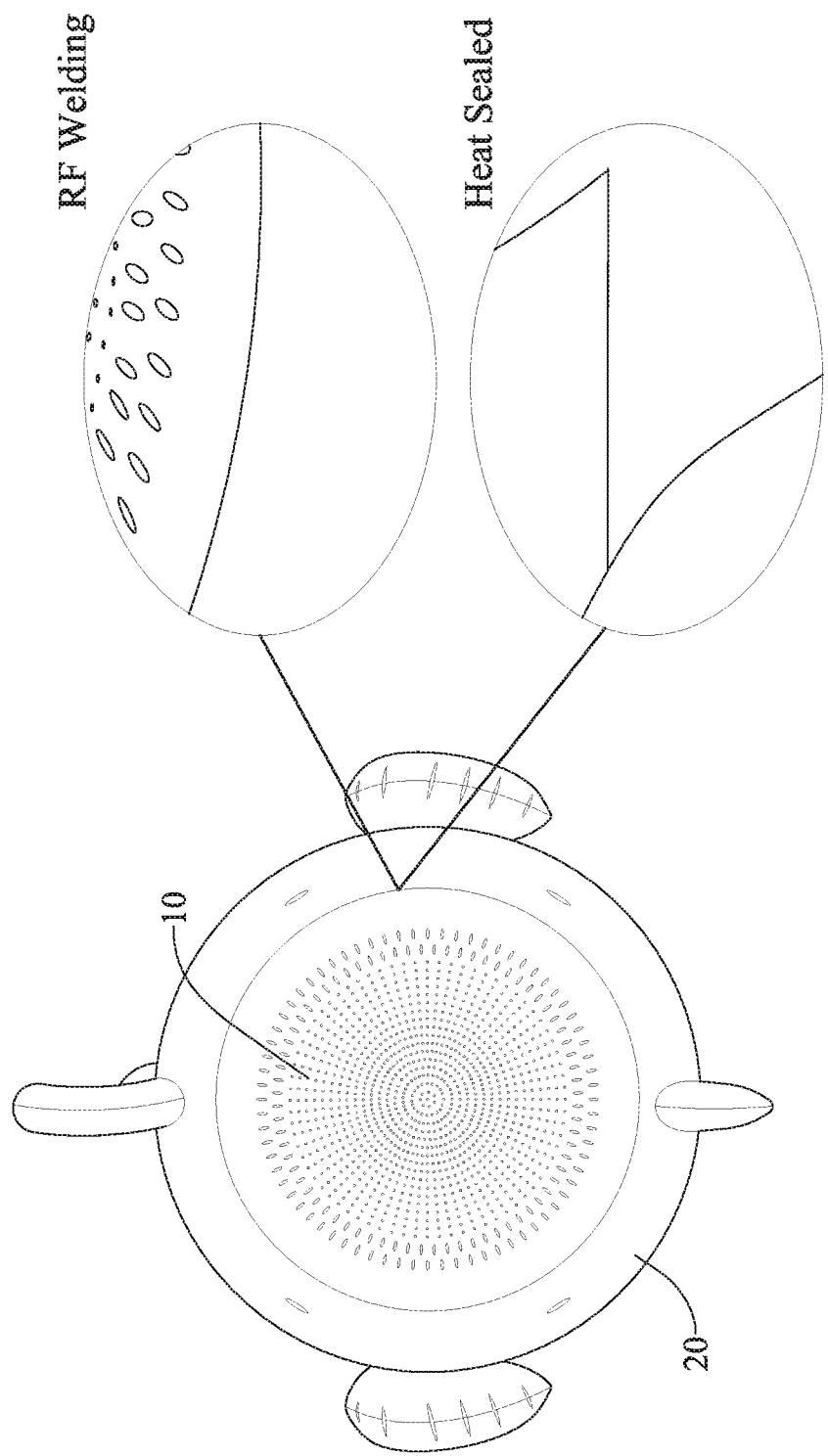
FIG. 5 is a schematic view of the trampoline.

As shown in FIG. 1, FIG. 2, and FIG. 3, a trampoline 100 comprises a top panel 10 and a main body 20. The top panel 10 is attached to the main body 20 using RF welding or heat sealing. The main body 20 comprises a toroidal shape with a central opening 21. The top panel 10 comprises a flat circular panel comprising a laminated polyvinyl chloride (PVC) material.

According to an embodiment of the invention, the manufacturing method comprises providing a top panel 10 and a main body 20, heat sealing or RF welding the top panel 10 to the main body 20 around the perimeter of the top panel 10 and the main body 20, wherein the size and shape of the top panel 10 is sized according to the central opening 21 of the main body 20.

In an embodiment, the main body 20 may be gas-filled.

As shown in FIG. 1, in an embodiment, the top panel 10 may further comprise small venting holes 11 sized small enough such that human toes or fingers cannot be trapped by the small venting holes 11. The top panel 10 may further comprise larger ovular venting holes 12.

In another embodiment, the top panel 10 and the main body 20 may be formed of the same material and/or as a single structure. The method for manufacturing may comprise forming the trampoline 100 wherein the top panel 10 and the main body 20 are formed as a single piece without a heat sealing or RF welding.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A trampoline comprising:
   a top panel with a plurality of first venting holes in a first size and a plurality of second venting holes in a second size, wherein said first size is smaller than said second size; and
   a main body with a center opening;

wherein said top panel is RF welded or heat sealed to said main body, around the perimeter of said top panel and said main body, covering said center opening; and wherein said plurality of said second venting holes is arranged along the perimeter of said top panel, and said plurality of said first venting holes is surrounded by said plurality of said second venting holes.

2. The trampoline of claim 1, wherein said main body is in a toroidal shape, and said center opening is at a center of said toroidal shape.

3. The trampoline of claim 1, wherein said main body is gas-filled.

4. The trampoline of claim 1, wherein said top panel comprises a flat circular panel comprising a laminated polyvinyl chloride material.

5. The trampoline of claim 1, wherein each of said plurality of second venting holes is oval.

6. The trampoline of claim 1, wherein said center opening is oval.

7. The trampoline of claim 1, wherein said plurality of second venting holes is arranged in two rows along the perimeter of said top panel.

* * * * *